United States Patent
Wernig

[11] 3,792,901
[45] Feb. 19, 1974

[54] PROTECTIVE SHIELD FOR MOTOR VEHICLE OCCUPANT

[76] Inventor: James H. Wernig, 2311 Walton Blvd., Apt. No. 29, Rochester, Mich. 48063

[22] Filed: May 17, 1971

[21] Appl. No.: 144,091

[52] U.S. Cl............... 296/84 K, 180/91, 280/150 B
[51] Int. Cl................................................. B60j 1/20
[58] Field of Search.. 280/150 B; 180/91; 296/84 K, 296/97 S, 97 R; 248/293

[56] References Cited
UNITED STATES PATENTS

| | | | |
|---|---|---|---|
| 3,118,700 | 1/1964 | Von Winnersperg | 296/84 K |
| 3,325,208 | 6/1967 | Rose | 296/84 K |
| 2,933,343 | 4/1960 | Potts | 296/84 K |
| 2,592,573 | 4/1952 | Joncas | 280/150 B X |
| 2,100,427 | 11/1937 | Blocker | 296/97 J X |

Primary Examiner—Frank E. Werner
Attorney, Agent, or Firm—A. F. Baillio

[57] ABSTRACT

Shields for minimizing head injuries to front seat occupants of self-propelled vehicles as a result of being thrown against the windshield of the vehicle by a collision which are automatically moved from a stored position to a position between the occupants and the windshield in advance of solid contact between the vehicle and the other object.

The shields normally serve as the sunshades of the vehicle and are made of two panels which are normally held in overlying positions but are moved to side by side position when the shields are automatically interposed between the front seat occupants and the windshield so that they cover a greater area of the windshield and afford more protection.

The shields can, however, be moved manually in the same manner as conventional sunshades from their stored position to a position in which they serve to shade the front seat occupants' eyes from glare and back to stored position without extending the shields or disabling the mechanism which automatically operates them in the event of a collision.

In addition to the shields which serve as sunshades, there is also provided a shield to protect the front seat occupants against collision with the inside rear view mirror and the portion of the windshield below it which is positively moved from its stored to its operational position and is provided with portions which overlie the inner edges of the sunshades and thus positively moves them to their operational positions.

The invention also includes a mechanism for automatically recocking the shield operating mechanism and returning the shields to their stored positions after they have been moved to their operational positions.

8 Claims, 9 Drawing Figures

PATENTED FEB 19 1974                3,792,901

INVENTOR.
JAMES H. WERNIG
BY

INVENTOR.
JAMES H. WERNIG

INVENTOR.
JAMES H. WERNIG
BY

PROTECTIVE SHIELD FOR MOTOR VEHICLE OCCUPANT

SUMMARY OF INVENTION

This invention relates to means for minimizing injury to occupants of self-propelled vehicles as a result of being thrown against a wall of the vehicle by a collision and is an improvement on the invention disclosed in my prior application, Ser. No. 869,697, filed Oct. 27, 1969. Particularly, it relates to shields which are ordinarily stored so they do not interfere with the occupant's vision and are automatically interposed between the occupants and the wall in the event of a collision.

A principal object of the invention is to provide a shield which will be automatically moved from a stored position to a position between an occupant and a wall of the vehicle in advance of solid contact between the vehicle and another object.

Another principal object of the invention is to make the same member serve as such a shield and a sunshade and make it in two panels which normally overlie each other but are moved to side by side relation when the member is automatically interposed between the occupant and the wall of the vehicle so that it covers a greater area of the wall and affords more protection but may be moved manually in the same manner as conventional sunshades from its stored position to a position in which it serves to shade the occupant's eyes from glare and back to stored position without extending the shield or disabling the mechanism which automatically operates it in the event of a collision.

A further object of the invention is to improve in several respects the mechanism disclosed in my prior application, Ser. No. 869,697, which include:
1. providing means for positively moving the shield from its stored position to its operational position in order to expedite its movement,
2. providing means for automatically returning the shield to its stored position if it is accidentally moved to operational position,
3. providing means for reducing the effort required to withdraw the detent which retains the actuator in its wound-up position, and
4. to simplify the mechanism and render it less expensive to produce in several respects.

For a better understanding of the nature and objects of the invention, reference is made to the following specification and accompanying drawing wherein the preferred embodiment of the invention is described and shown.

BRIEF DESCRIPTION OF DRAWING

FIG. 8 shows the drive disengaged and FIG. 9 shows it engaged.

DESCRIPTION OF PREFERRED EMBODIMENT

Figure 1:
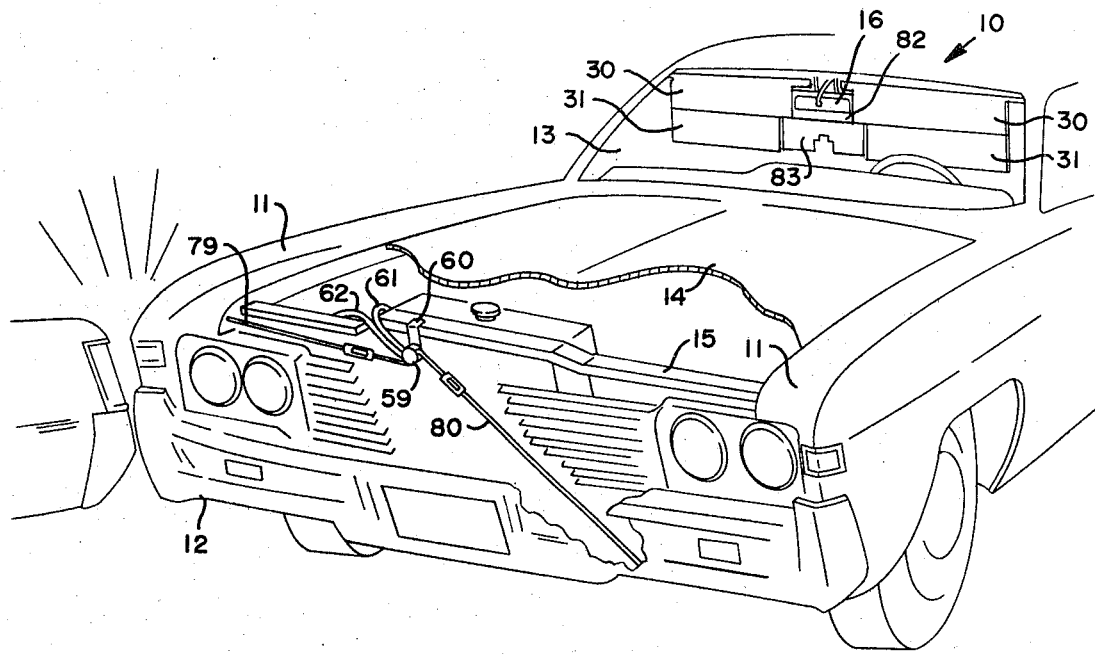
FIG. 1 is a perspective view of the front end of an automotive vehicle equipped with protective shields for the front seat occupants and a part of the rear end of a preceding vehicle.

The automotive vehicle shown in the drawing includes a frame (not visible), and a body 10, front fenders 11 and a front bumper 12 mounted on the frame. The body defines the compartment for the driver and passengers and has a windshield 13 at its front end. Forward of the body is an engine compartment which is defined by the front fenders 11 and a hood 14. The front fenders are tied together near their forward ends by a cross member 15. Within the body above the windshield in the middle of the vehicle is mounted a rear view mirror 16 and rearward of the mirror an actuator 18 for the shields.

The actuator 18 includes a frame which consists of a base plate 19 and end plates 20 secured to the base plate. In the end plates, there is journalled a rotor which consists of a shaft 21 with slotted ends and a block 22 which is fixed to the shaft between the end plates.

Near the sides of the vehicle above the windshield are mounted brackets 24. Between each of the brackets and the actuator extends a shaft 25 which is keyed to the actuator shaft 21 so that the shaft 25 turns with it. The outer ends of the shafts 25 are mounted to turn in the brackets 24.

On each of the shafts 25 is mounted to swing through an elongated parti-cylindrical sleeve 29 on its upper edge a shield which consists of upper and lower panels 30 and 31. The parti-cylindrical portion of each sleeve encircles the shaft on which it is mounted and has wings 32 which straddle the upper edge of the upper panel 30 and are fastened to it. The inner end of the parti-cylindrical portion of each of the sleeves is encircled by a clamp 33 which may be adjusted by a screw 34 to vary the friction between the sleeve and the shaft 25 it encircles. Mounted on a guide on the upper edge of each of the upper panels to slide lengthwise thereof is a rod 26.

Figure 2:
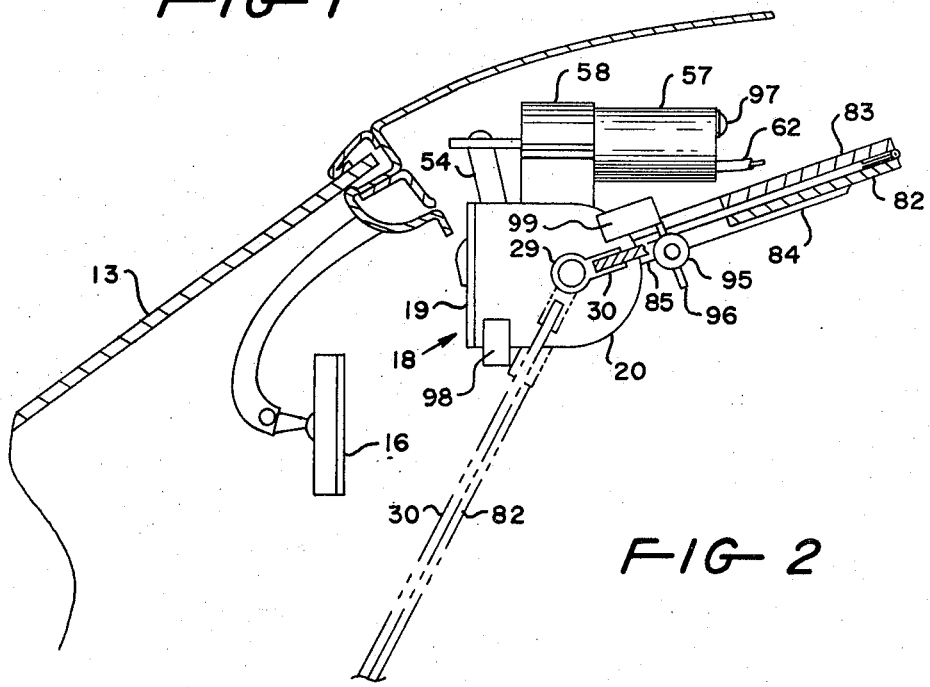
FIG. 2 is a side elevation of the shields and the actuator therefor in the vehicle.
Figure 3:
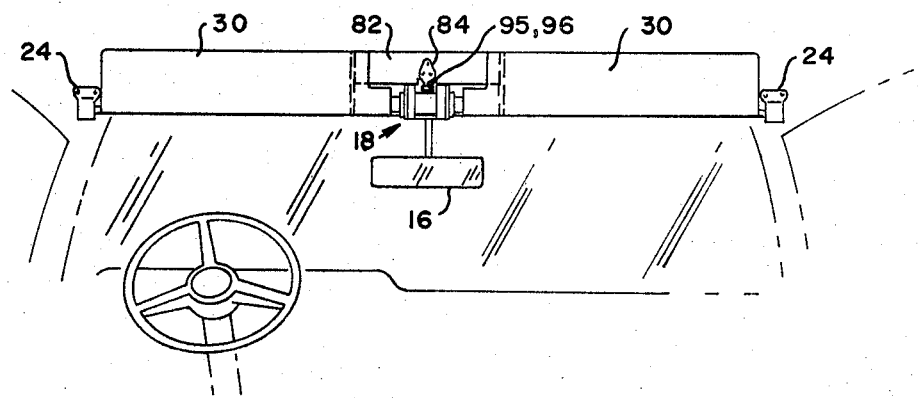
FIG. 3 is an elevation of the shields and the actuator as seen from within the vehicle.
Figure 4:
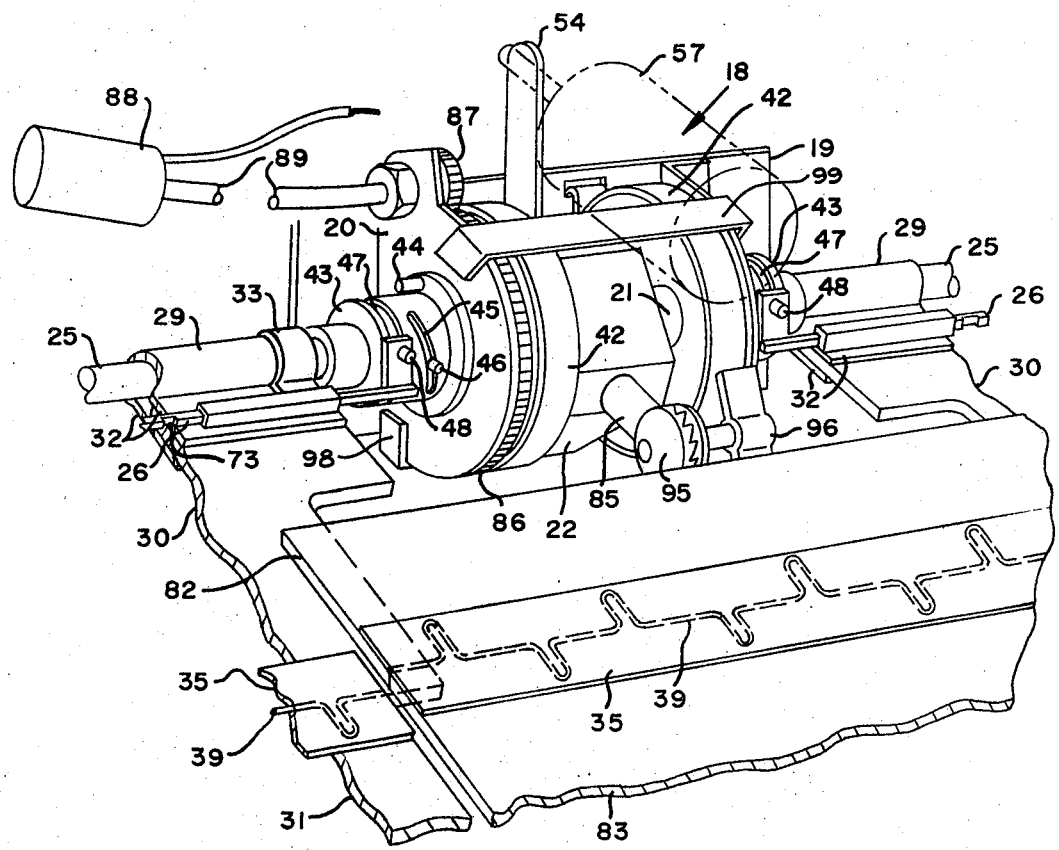
FIG. 4 is a perspective view of the actuator and adjacent portions of the shields.
Figure 7:
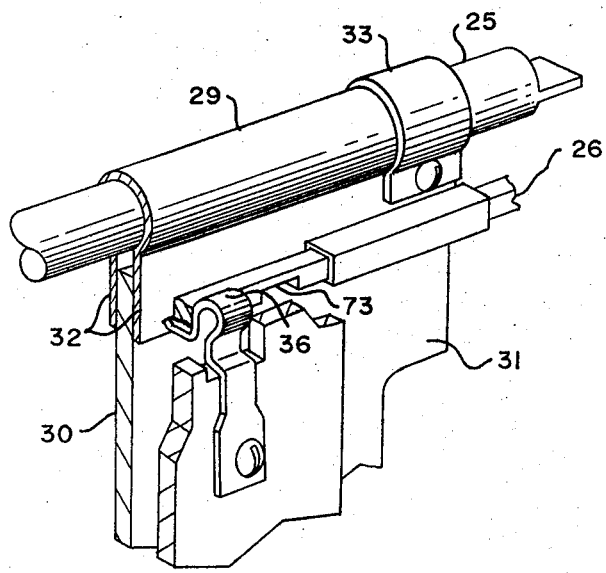
FIG. 7 is a perspective view of portions of one of the shields and the latch between its constituent panels.
Figure 8:
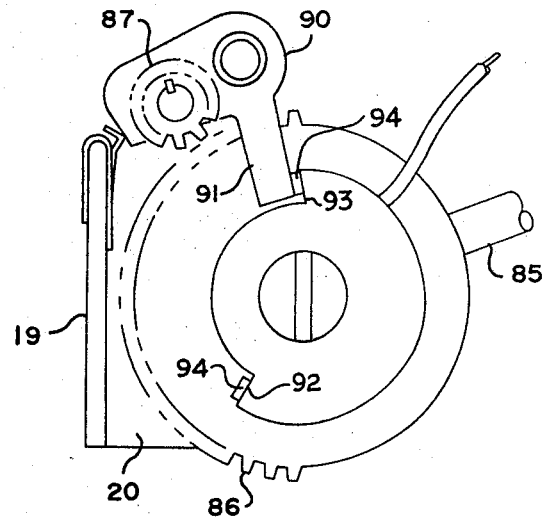
FIGS. 8 and 9 are end views of the actuator with an end plate removed to show the rewind mechanism.
Figure 9:
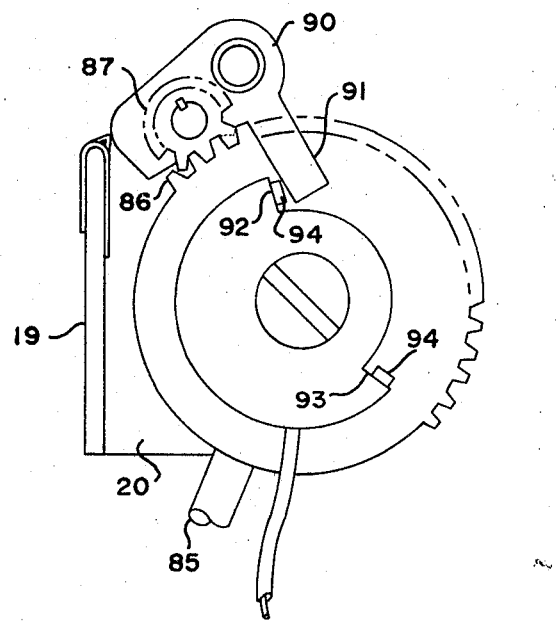

The upper and lower panels of each of the shields 30-31 are connected by a flexible web 35 which permits them to move from the overlying position in which they are shown in FIGS. 3 and 7 to the side by side position in which they are shown in FIGS. 1, 2 and 4. The two panels are normally held in their overlying positions by engagement of one or more clips 36 on the lower edge of the lower panel with a portion of the rod 26 outward of the notch 73. There is, however, embodied in the web 35 a bent wire spring 39 which moves the lower panel into side by side relation with the upper panel when the clip 36 is released from the rod 26 by moving the notch 73 into registration with the clip.

Around the shaft of the actuator 18 between the block 22 and each of the end plates 20 there is installed a flat spiral spring 42. The inner end of each of the springs 42 is hooked in the adjacent slot in the shaft 21 and the outer end in an opening in the base plate and the spring is pre-stressed so that it tends to turn the rotor 21-22 and the shafts 25 in the direction to swing the shields 30-31 downwardly and forwardly toward the windshield.

On each end of the actuator shaft outside the adjacent end plate is mounted a flanged sleeve 43. The sleeves are keyed to the end plates by pins 44 which are fixed to the end plates and extend through the flanges so that the sleeves can slide on the shaft but not rotate with it. In each of the sleeves there is provided an inclined slot 45 into which extends a pin 46 fixed to the shaft so that when the shaft is turned in the direction to swing the shields downwardly and forwardly toward the windshield, the sleeves move away from the end plates. Outward of the slots 45 there are provided in the sleeves grooves 47 which extend rectangularly of the sleeves. Into these grooves there project pins 48 fixed to the inner ends of the rods 26 so that when the sleeves move outwardly they, in turn, push the rods 26 outwardly and move the notches 73 in the rods into registration with the clips 36 so that the springs 39 in the webs 35 can swing the lower panels 31 of the shields from overlying into side by side relation with the upper panels 30.

The shafts 25 which are keyed to the shaft of the actuator are disposed at a small angle to it because the brackets 24 have to be located somewhat to the rear of the actuator because of the rearward curvature of the windshield. However, any adverse effect of this on the operation of the actuator can be obviated by either of two expedients. One is to interconnect the shafts by universal joints. Another is to key the shafts together so that the bending strain in the shafts is relieved as the shields move downwardly and forwardly so that the bending strain even aids the actuator in moving the shields in this direction.

Figure 5:
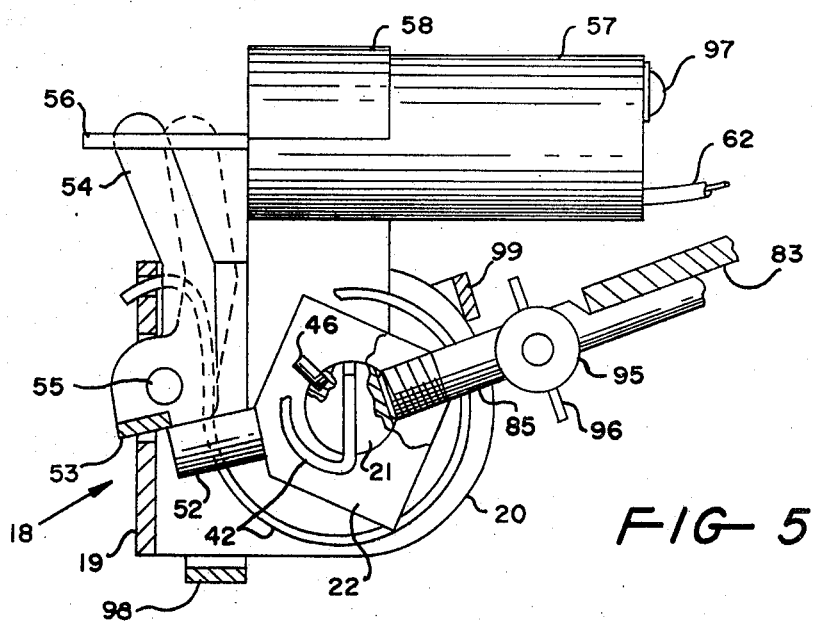
FIG. 5 is an end view of the actuator with parts removed and in section.
Figure 6:
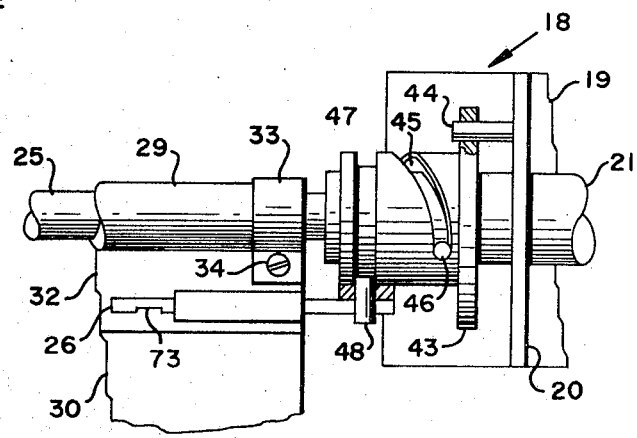
FIG. 6 is fragmentary view of the adjacent ends of the actuator and a shield.

The actuator 18 is wound up by turning the rotor 21-22 counter-clockwise as it is viewed in FIG. 5. To hold the rotor in wound-up position until the shields are needed, there is provided a latch which consists of a projection 52 on the block 22 and a detent 53. The detent is formed on one end of a lever 54 which is mounted to swing near its detent end on a pin 55 carried by the base plate 19. The other end of the lever extends into a slot 56 in the outer end of the armature of a solenoid 57 which is mounted on the frame of the actuator through a bracket 58. When the actuator is wound up, the detent is held by a spring in the solenoid housing in its innermost position in which it slightly overlaps the projection 52. When the solenoid is activated, the armature is retracted and through the lever 54 moves the detent 53 out of the path of the projection 52 and releases the rotor.

When the actuator is activated, the shafts 25 are turned in the direction to move the shields downwardly and forwardly toward the windshield and because of the friction between the shafts and the sleeves 29 the shields are moved in the same direction. However, the actuator springs 42 are sufficiently strong to turn the rotor against the friction between the sleeves 29 and the shafts 25 and actuate the sleeves 43 and the rods 26 to release the clips 36 and the lowe panels of the shields if the shields are in use as sunshades when the actuator is activated.

To activate the solenoid 57 and the actuator, there is provided a normally open switch 59 mounted on a bracket 60 which is secured to the cross member 15 which extends between the front fenders of the car. One terminal of the switch is connected by a wire 61 to one terminal of a power source, such as the storage battery of the car, and the other terminal of the switch is connected by a wire 62 to one terminal of the coil of the solenoid. The other terminals of the battery and the coil are grounded so that current is supplied to the coil when the switch is closed.

To operate the switch, which is shown and described in more detail in my application Ser. No. 869,697, and in a division thereof Pat. No. 3,700,841 dated Oct. 24, 1972, there is provided on each of its body members an arm of which one is connected to one of the fenders 11 of the car by a rod 79 and the other to the bumper 12 by a rod 80. In each of the rods there is installed a turnbuckle to adjust its length.

Any displacement of a fender, the bumper or the cross member beyond that incident to normal vibration of the car, such as will occur in the event of a front end collision of any consequence, will result in movement of one of these parts with respect to another and closing the switch.

Because the fenders, bumper and cross member are relatively easily crushed or displaced, such a front end collision will displace one or more of these parts sufficiently to close the switch a fraction of a second before anything sufficiently solid, such as the engine or the frame, is encountered to significantly decelerate the vehicle or throw the occupants toward the windshield with injurious force. The switch thus activates the actuator in advance of significant deceleration of the vehicle or movement of the occupants toward the windshield by inertia instead of simultaneously as inertia actuators do and thus affords this margin of time to get the shields 30-31 between the occupants and the windshield before their heads strike the windshield.

The shields 30-31 are ordinarily sufficient to protect the driver and a passenger in their normal positions in the front seat in the event of a collision with an object straight ahead of the vehicle. But they may not be sufficient if the collision has a sufficiently lateral component to throw one of them against the rear view mirror or the portion of the windshield below it that is not covered by these shields or if there is a person in the middle of the front seat.

To protect all of the front seat occupants under such circumstances, a third shield is provided to cover the rear view mirror and the portion of the windshield between the shields 30-31 in the event of a collision. This shield is composed of upper and lower panels 82 and 83 hinged together similarly to the sections 30 and 31 of the main shields.

The intermediate shield 82-83 is mounted on the rotor 21-22 of the actuator by a bracket 84 which is secured to the upper panel 82 and has an arm 85 which is secured to the block 22. When the springs 42 turn the rotor of the actuator to move the shields 30-31 to their interposed positions, they move the shield 82-83 in the same direction and the hinge spring 39 moves the lower panel into side by side relation with the upper panel. Movement of the actuator in this direction is limited by contact of the arm 85 with the stop 98.

The springs 42 are made strong enough to move the shields 30-31 and 82-83 from their stored to their operational positions as rapidly as reasonably possible when the latch 52-53 is released because if the shields are to be effective, they must be in their operational positions before the heads of the front seat occupants are thrown toward the windshield by inertia. The shields 82-83 move with the rotor of the actuator but there may be some delay in movement of the shields 30-31 because of the frictional nature of the connection between the shafts 25 and the shields and the inertia of the shields 30-31. To eliminate any such delay, there are provided on the upper panel 82 portions which overlap the inner edges of the upper panels 30 so that the shields 30-31 are positively moved with the shields 82-83. So that the overlap will not interfere with movement of the lower panels 31 of the shields 30-31, the panels 31 are made shorter than the panels 30 by something more than the overlap, as shown in FIG. 4 and indicated in FIG. 3.

To return the shields from their operational positions to their stored positions and rewind the actuator, the lower panel of the shield 82-83 is swung into overlying with respect to the upper panel and the shield as a whole to its stored position whereupon the latch 52-53 will hold the shield in its stored position with the lower panel on top of the upper panel. Movement of the actuator and the shields in this direction is limited by contact of the arm 85 with the stop 99. The proximity of the shield 82-83 to the roof keeps the lower panel in place until the actuator is reactivated. If the friction between the sleeves 29 and the shafts 25 is insufficient to move the shields 30-31 with the shield 82-83 when the former are in their extended positions, it will be necessary to perform corresponding operations on the shields 30-31, whereupon the friction between the sleeves and shafts and the clips 33 will hold these shields in their stored positions with their constituent panels against each other. If the shields 30-31 have moved upwardly with the shield 82-83, it will, of course, be necessary to swing them down again against the friction between the sleeves 29 and the shafts 25 before performing the last-described operation.

To do this automatically, except for moving the lower panels into overlying positions with respect to the upper panels, there is provided a rewinding mechanism for the actuator. This mechanism includes a gear 86 fixed to the actuator shaft between one of the side plates 20 and the adjacent spring 42 and a pinion 87 which may be driven by an electric motor 88 through a flexible shaft 89. The pinion 87 is carried by one arm of a lever 90 which is mounted on the actuator frame to swing between a position in which the pinion is in mesh with the gear 86 and a position in which the pinion is out of mesh with the gear. To move this arm from one of these positions to the other, there are provided on the gear abutments 92 and 93 with switch buttons 94 on them in positions to engage the other arm 91 of the lever. When the shields reach their operational positions, the abutment 92 engages the arm 91 and swings the pinion 87 into mesh with the gear and closes the switch to energize the motor 88 and turn the actuator shaft to rewind the springs 42 and move the projection 52 back under the detent 53 and relatch the rotor of the actuator. At this point, the abutment 93 engages the arm 91 of the lever and swings the pinion out of mesh with the gear and opens the rewinding mechanism switch and thus readies the actuator for another operation.

With the automatic rewinding mechanism, to put the lower panel of the shield 82-83 back on top of the upper panel, it will be necessary after the shield 82-83 has been returned to its stored position to swing it down again. To enable this to be done, the bracket 84 is hinged to the rod 85 by a serrated joint 95 and a thumbscrew 96. After the lower panel has been swung back into place on top of the lower panel, the bracket 84 must, of course, be swung back into alignment with the rod 85 and clamped in that position by the thumbscrew.

To prevent recycling of the actuator and shields and warn that the shields are not automatically operative, there is incorporated in the solenoid 57 a cut-out to open the circuit to the solenoid and close a circuit to a light 97 in the event the switch 59 does reopen immediately. A time-delay mechanism may be incorporated in the mechanism for closing the rewinding mechanism switch to delay the rewinding operation briefly.

It is contemplated that the panels 30 and 31 and 82 and 83 will be constructed so that they will yield by both crushing and bending and/or stretching. They will then owe their ability to minimize injury to two or three factors. One is their crushability. Another is that they do not conform to the curvature of the windshield and, therefore, yield further by bending before solid contact is made with the windshield. The third is their ability to conform to the shape of the head and thus increase the effective area of contact with the windshield. The shields thus reduce the velocity of impact and increase the effective area of contact with the windshield.

I claim:

1. In a self-propelled vehicle, a protective shield for interposition between an occupant and a wall of the vehicle, a shaft on which the protective shield is mounted so that it is manually swingable against friction in both directions between a stored position and an operational position, means for moving the shaft to frictionally swing the shield between such positions, and means positively swingable by the first-mentioned means and engageable with the shield to positively move the shield from its stored position to its operational position.

2. The invention claimed in claim 1 in which the last-mentioned means is another shield.

3. In a self-propelled vehicle, a protective shield for interposition between an occupant and a wall of the vehicle, a force exerting member movable from a charged to a relieved position to move the shield toward its interposed position, and means for returning the member from its relieved position to its charged position and recharging it which includes another force exerting member and means for automatically energizing it when the member reaches its relieved position.

4. In a self-propelled vehicle, a protective shield for interposition between an occupant and a wall of the vehicle, a spring for moving the shield to its interposed position, a detent for holding the spring in an energized position, means for releasing the detent and the spring to move the shield toward its interposed position, and means for restoring the spring to said energized position and re-energizing it which includes a force exerting member other than the spring and means for automatically energizing it when the spring reaches the limit of its movement toward a de-energized position.

5. In a self-propelled vehicle, a protective shield for interposition between an occupant and a wall of the vehicle, a spring for moving the shield to its interposed position, a shaft on which the shield is mounted and to which the spring is connected, a detent associated with the shaft to hold the spring in an energized position, means for releasing the detent and the spring so that the shaft is turned by the spring and the shield is moved toward its interposed position, and means for re-energizing the spring when it has reached the limit of its movement toward a de-energized position, including a power mechanism and a clutch and means for automatically energizing them when the spring reaches said limit.

6. The invention claimed in claim 5 in which the re-energizing means includes an electric motor and a gear and a pinion which is movable into and out of mesh with the gear.

7. In a self-propelled vehicle, a protective shield for interposition between an occupant and a wall of the vehicle, means on which the shield is mounted so that it may be manually moved from a stored position to an operational position and back to the stored position, and means including an actuator and means independent of the mounting means and unaffected by manual movement of the shield for positively transmitting movement of the actuator to the shield to move the shield from stored position to operational position.

8. The invention claimed in claim 7 in which the shield is frictionally mounted on the first-mentioned means.

* * * * *

UNITED STATES PATENT OFFICE
CERTIFICATE OF CORRECTION

Patent No. 3,792,901   Dated February 19, 1974

Inventor(s)  James H. Wernig

It is certified that error appears in the above-identified patent and that said Letters Patent are hereby corrected as shown below:

On the cover sheet [76] "2311 Walton Blvd., Apt. No. 29, Rochester, Mich. 48063" should read -- Box 501, Kennebunkport, Maine 04046 --.

Signed and sealed this 12th day of November 1974.

(SEAL)
Attest:

McCOY M. GIBSON JR.           C. MARSHALL DANN
Attesting Officer             Commissioner of Patents